US009073386B1

(12) United States Patent
Bar Shlomo

(10) Patent No.: US 9,073,386 B1
(45) Date of Patent: Jul. 7, 2015

(54) MOVABLE PAINT TRAY

(71) Applicant: Hanan Bar Shlomo, Ramat HaSharon (IL)

(72) Inventor: Hanan Bar Shlomo, Ramat HaSharon (IL)

( * ) Notice: Subject to any disclaimer, the term of this patent is extended or adjusted under 35 U.S.C. 154(b) by 95 days.

(21) Appl. No.: 14/106,896

(22) Filed: Dec. 16, 2013

(51) Int. Cl.
*B62B 3/08* (2006.01)
*B44D 3/12* (2006.01)

(52) U.S. Cl.
CPC ...................................... *B44D 3/126* (2013.01)

(58) Field of Classification Search
CPC ................................ B44D 3/126; B62B 3/104
USPC ..................................... 280/79.11, 79.2, 79.5
See application file for complete search history.

(56) References Cited

U.S. PATENT DOCUMENTS 3,044,096 A * 7/1962 Englehart .................. 15/257.05
3,663,982 A * 5/1972 Hayden ...................... 15/257.01
3,752,494 A * 8/1973 Dunn ......................... 280/47.26
4,325,323 A * 4/1982 Rioux ........................... 118/504
4,356,588 A * 11/1982 Martucci .................... 15/257.06
4,941,229 A * 7/1990 La Pierre ................... 15/257.06
4,993,726 A * 2/1991 Schumacher et al. .......... 280/38
5,002,293 A * 3/1991 Gottselig ................... 280/47.35
5,046,749 A * 9/1991 Owens ......................... 280/79.5
5,082,301 A * 1/1992 Schumacher et al. .......... 280/38
5,190,303 A * 3/1993 Schumacher et al. .......... 280/38
5,609,322 A * 3/1997 Bond ............................ 248/558
7,311,219 B1 * 12/2007 Kallas et al. .................. 220/570
7,568,667 B1 * 8/2009 Feik et al. ...................... 248/129
2009/0302563 A1 * 12/2009 Thibault .................... 280/47.34
2013/0186902 A1 * 7/2013 Bar-Shlomo .................. 220/570
2014/0097587 A1 * 4/2014 Szasz ......................... 280/79.11

* cited by examiner

*Primary Examiner* — Jeffrey J Restifo

(57) ABSTRACT

A paint tray designed to be assembled into a board. Two wheels are attached to the underside of the board, enabling the tray and the board to be moved around on the floor. The tray is equipped with legs that are attached to the underside of the tray and serve to stabilize the tray and board on the floor. The tray is connected to the board by axial connections on both sides and by a spring at the front end. When force is exerted on the front end of the tray, the front tends downwards whilst the back end rises so that the legs detach from the floor, enabling the board and tray to move about on the floor.

1 Claim, 2 Drawing Sheets

MOVABLE PAINT TRAY

FIELD OF THE INVENTION

The present invention refers to a paint tray.

BACKGROUND OF THE INVENTION

Professional artisans in the field of painting, as well as people from the general public customarily paint walls or ceilings or other objects using a paint brush or a roller. Many manufacturers manufacture devices designed to assist in the painting work, including a paint tray. Conventionally, the tray is filled with paint and the roller or brush is then dipped in the tray in order to start executing the painting work. Also see U.S. patent application Ser. No. 12/587,299 of the first version of the product.

The use of the standard paint tray has several disadvantages. First, it is very cumbersome to move the tray from one location to the next as the work progresses. The user must usually bend over, hold the tray in his or her hands, and move it from place to place. Sometimes, the user moves the tray by pushing it lightly it with his or her foot or the roller, potentially scratching the floor. Second, during the course of the paining, paint tends to drip onto the base panels and floors, requiring immediate clean-up and interrupting the flow of work. The present invention offers a solution to the above problems in the form of an innovative paint tray that makes the painting work more efficient.

LIST OF DRAWINGS

The following drawings are not intending to limit the scope of the invention and the possible options of its application. The drawings are intended only to illustrate the invention and constitute only one possible way of its application.

Figure 1:
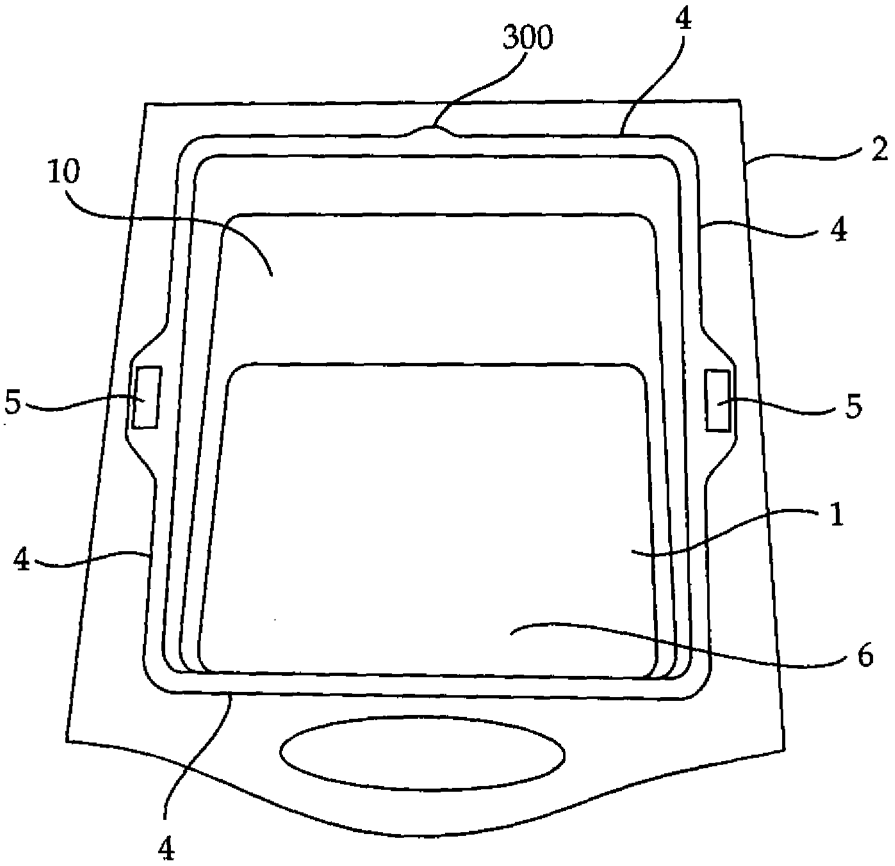

FIG. 1 presents a top view of the tray (1) and the board (2).

Figure 2:
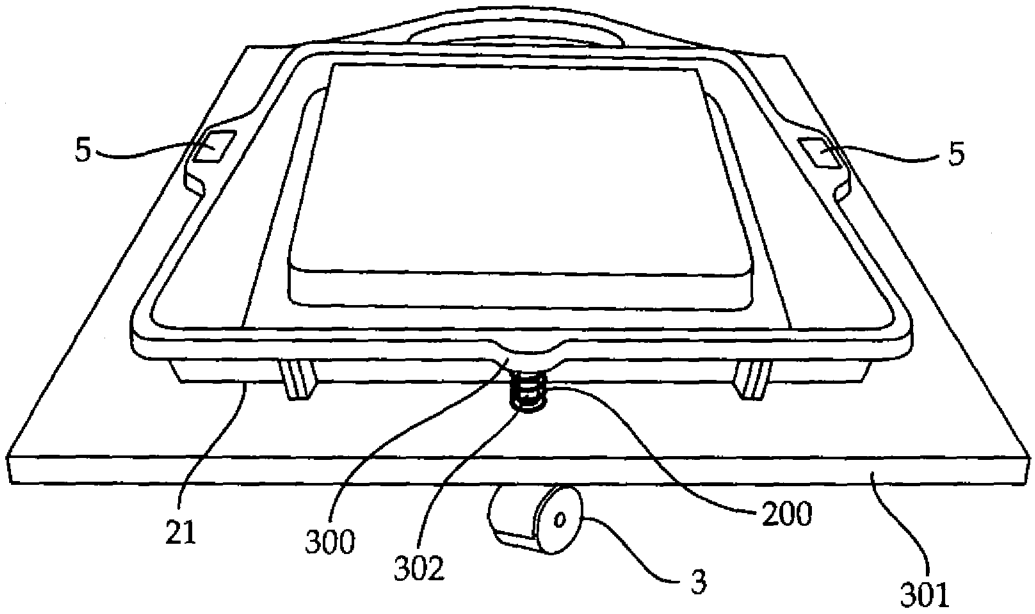

FIG. 2 presents a front perspective view of the tray (1) and the board (2).

Figure 3:
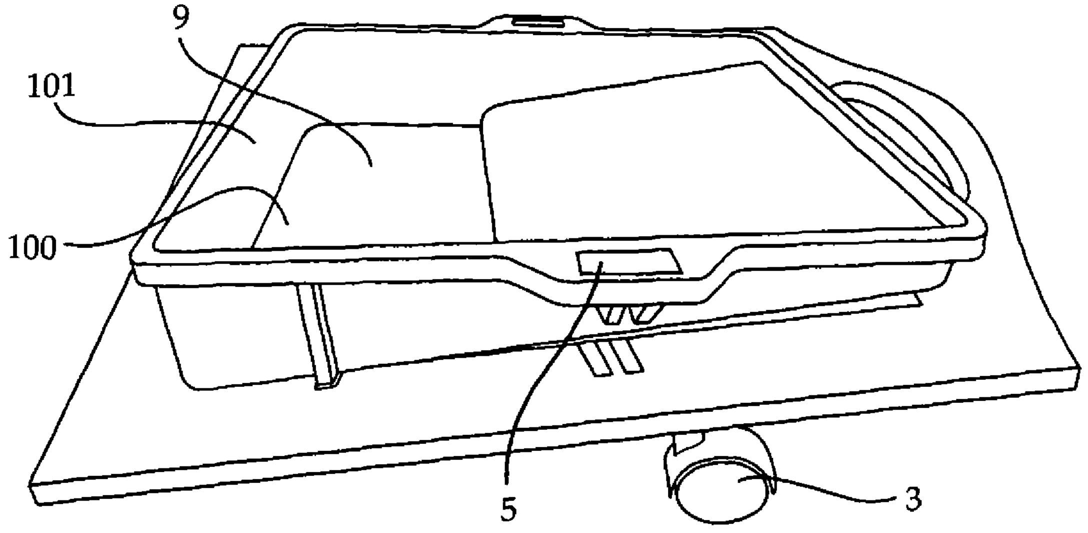

FIG. 3 presents a side perspective view of the tray (1) and the board (2).

Figure 4:
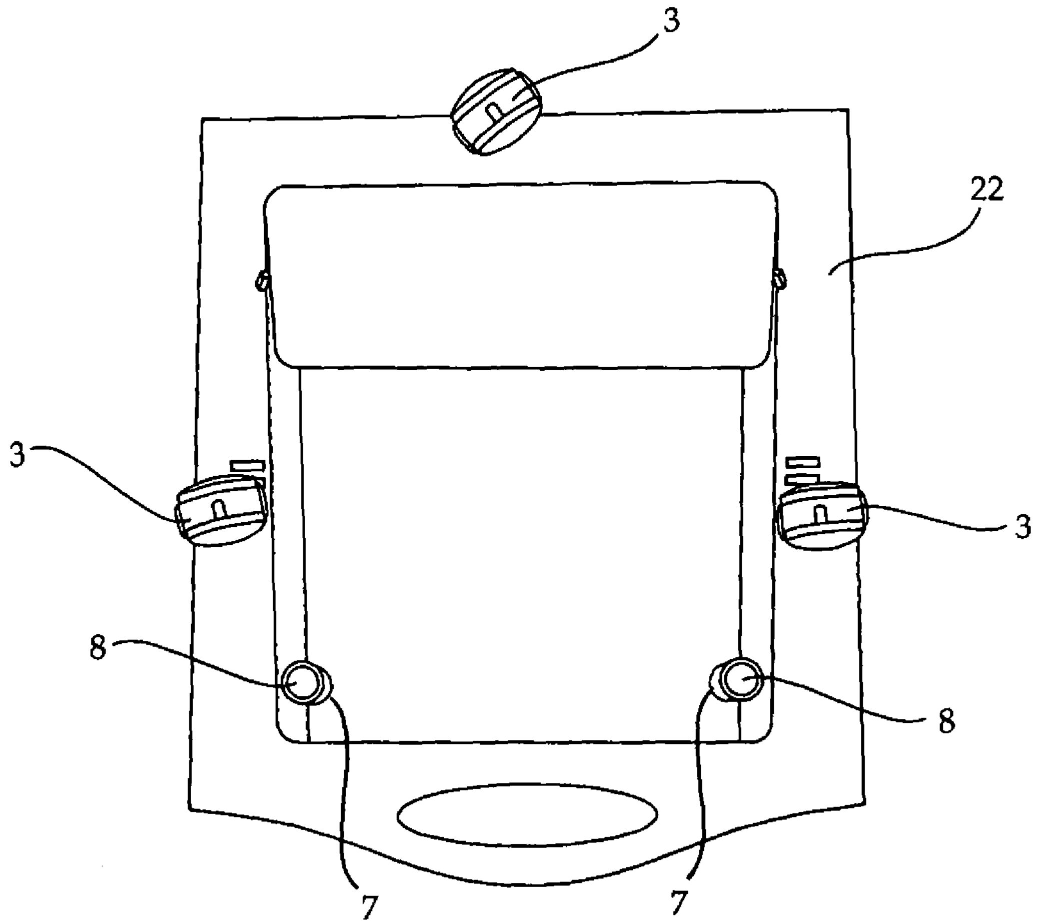

FIG. 4 presents a bottom perspective view of the tray (1) and the board (2).

THE INVENTION

The present invention relates to a paint tray (1) that is assembled into a movable board (2). The board (2) is designed as a quadrangle frame with a central cut-out (21). Several wheels (3) are affixed to the underside (22) of the board (2), enabling the board to be moved about.

The general shape of the tray (1) can be that of any standard paint tray. The circumferential rim (4) of the tray (1) is wider than the board's central cut-out (21) in a way that enables the user to assemble the tray (1) into the board (2) so that the circumferential rim (4) of the tray (1) fits over the edges of the central cut-out (21). As is customary, the tray (1) has a front deep end (10) and a shallow back end (6).

One or more legs (7) are attached to the underside of the tray (1) at the back shallow end (6). The bottom of each leg is equipped with a rubber friction pad (8) that stabilizes the tray and board so that they do not move when the roller or paintbrush is being dipped into the tray. The legs (7) of the tray (1), in effect, serve as stoppers to prevent any undesired movement of the tray: they are attached to the bottom part of the tray and they are in contact with the floor during use, preventing the tray and the board from moving as a result of any accidental contact with or pressure on the tray or board. The tray (1) is connected to the board by axial connections (5) on either side. The front end (10) of the tray (1) is attached to the board (2) by a spring (200), as will be described later on. The front end (10) of the tray (1) has a recess (300) with a hole directed downward, while the front end (301) of the board (2) is equipped with a vertical pin (302). The spring (200) is placed over the pin (302) and the top of the spring (200) is then inserted into the recess (300). Thus, the spring (200) exerts upward pressure on the front end (10) of the tray (1) causing the legs (7) to press downward against the floor.

When pressure is exerted on the deep part (9) of the tray (1) from above, the front end (10) of the tray tilts downward whilst the back end (6) of the tray rises and the legs (7) detach from the floor, enabling the wheels (3) to roll and the tray and the board to move about on the floor. The user may exert such pressure on the deep part (9) of the tray using the roller or paint brush.

The apparatus, subject of the present invention, provides the user with several advantages: (a) The tray and the board may be moved about on the floor according to the progression of the work in a facile and convenient manner. (b) The board prevents paint from dripping onto the base panels and floor. As described above, the present invention refers to a system that comprises a paint tray (1) that is assembled into a board (2). FIGS. 1-4 depict the tray (1) together with the board (2), in detail, whereby the tray (1) consists of a bottom flat plate (100) with vertical peripheral sides (101) and a circumferential rim (4), such that the front end (10) of the tray (1) is relatively deeper than the back shallow end (6).

The board (2), as depicted in detail in FIGS. 1-4, is a flat plate with a cut-out (21) in its center. The size of the central cut-out (21) corresponds to the size of the tray (1) so that the tray (1) may be assembled into the board (2). However, the span of the circumferential rim (4) of the tray (1) is wider than that of the central cut-out (21), so that the tray (1) may be placed on the board (2) and the rim (4) prevents the tray (1) from falling through the central cut-out (21). When the tray (1) is assembled into the board (2), as depicted in detail in FIGS. 1-4, it actually rests on its pair of the legs (7). In order to keep the board (2) level, two or more wheels (3) that affixed to the underside of the board (2). Thus, the wheels (3) both serve as a stand and enable the user to roll the board (2) around according to need.

When the tray (1) is assembled with the board (2) in released position, the spring (200) exerts downward pressure on the back shallow end (6) of the tray (1), creating a vertical downward force on the legs (7), which stabilizes the tray and board on the floor during use. When the user applies vertical, downward pressure on the front end (10) of the tray (1), the back ends (6) rises since the tray (1) is, as mentioned above, connected to the board (2) by axial connections (5) on both sides.

What is claimed is:

1. A system comprising of a paint tray that is assembled into a board; wherein the tray consists of a bottom plate with vertical peripheral sides and a circumferential rim; wherein the front end of the tray is deeper than the back end; wherein said board consists of a flat board with a central cut-out; wherein the size of said central cut-out corresponds to the size of said tray so that the tray may be assembled into the board; wherein the span of the circumferential rim is wider than that of the central cut-out; wherein the board is equipped with two or more wheels that are affixed to its underside and both function as a stand and enable the board and tray to be rolled around during use; wherein the tray is assembled into the board using a pair of axial connections at two connection points at either side of the tray and the board accordingly; wherein the front end of the tray has a recess with a hole directed downward; wherein the front end of the board has a vertical pin; wherein the tray is attached to the board by a spring connection wherein said spring is placed over said vertical pin and the top of the spring is inserted into the hole in said recess; wherein when the spring is in released position it exerts vertical, upward pressure on the tray causing said legs to be pressed down against the floor; wherein one or more legs are attached to the underside of the back end of said bottom plate; wherein said legs are shaped like short poles; whereby when the tray is assembled with the board in released position, said spring applies downward pressure on the back end of the tray and when the user applies vertical, downward pressure on the front end of the tray, the back end rises.

* * * * *